United States Patent
Apostol, Jr. et al.

(10) Patent No.: US 7,349,424 B2
(45) Date of Patent: *Mar. 25, 2008

(54) ON-CHIP INTER-SUBSYSTEM COMMUNICATION INCLUDING CONCURRENT DATA TRAFFIC ROUTING

(75) Inventors: George Apostol, Jr., Santa Clara, CA (US); Mahadev S. Kolluru, San Jose, CA (US); Tom Vu, San Jose, CA (US)

(73) Assignee: PMC-Sierra, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/424,787

(22) Filed: Jun. 16, 2006

(65) Prior Publication Data

US 2006/0221931 A1 Oct. 5, 2006

Related U.S. Application Data (63) Continuation of application No. 10/086,953, filed on Feb. 28, 2002, now Pat. No. 7,095,752.

(60) Provisional application No. 60/272,439, filed on Feb. 28, 2001.

(51) Int. Cl.
*H04L 12/66* (2006.01)

(52) U.S. Cl. ........................ 370/463; 532/537

(58) Field of Classification Search ............... 370/463, 370/532, 356, 389, 392, 400, 461, 462, 447, 370/360, 395.2, 438, 351, 471, 537
See application file for complete search history.

(56) References Cited

U.S. PATENT DOCUMENTS

| | | | |
|---|---|---|---|
| 4,245,306 A * | 1/1981 | Besemer et al. | 709/245 |
| 4,697,262 A | 9/1987 | Segal et al. | |
| 5,590,287 A * | 12/1996 | Zeller et al. | 710/307 |
| 5,799,207 A | 8/1998 | Wang et al. | |
| 5,920,566 A | 7/1999 | Hendel et al. | |
| 6,034,542 A | 3/2000 | Ridgeway | |
| 6,118,462 A | 9/2000 | Margulis | |
| 6,122,690 A | 9/2000 | Nannetti et al. | |
| 6,321,285 B1 | 11/2001 | Sheafor et al. | |
| 6,347,344 B1 | 2/2002 | Baker et al. | |
| 6,677,786 B2 | 1/2004 | Kellgren et al. | |
| 7,095,752 B2 * | 8/2006 | Apostol et al. | 370/463 |
| 7,107,381 B2 * | 9/2006 | Earl et al. | 710/305 |

* cited by examiner

*Primary Examiner*—Chi Pham
*Assistant Examiner*—Alexander O. Boakye
(74) *Attorney, Agent, or Firm*—Schwabe, Williamson & Wyatt, P.C.

(57) ABSTRACT

In an integrated circuit, a data traffic router includes a number of multiplexors coupled to each other, and to subsystems of the IC. The subsystems selectively output to each other. The data traffic router selectively provides paths for the outputs to reach their destinations, to facilitate concurrent communications between at least two selected combinations of the subsystems.

16 Claims, 12 Drawing Sheets

Burst Write Timing

Figure 6a

Write Followed by Read Timing

ON-CHIP INTER-SUBSYSTEM COMMUNICATION INCLUDING CONCURRENT DATA TRAFFIC ROUTING

RELATED APPLICATIONS

This application is a continuation of U.S. patent application Ser. No. 10/086,953 filed Feb. 28, 2002 now U.S. Pat. No. 7,095,752, entitled "ON-CHIP INTER-SUBSYSTEM COMMUNICATION INCLUDING CONCURRENT DATA TRAFFIC ROUTING" which claims priority to U.S. Provisional Application No. 60/272,439 filed Feb. 28, 2001, entitled "MULTI-SERVICE PROCESSOR INCLUDING A MULTI-SERVICE BUS", the specifications of which are hereby fully incorporated by reference.

BACKGROUND OF THE INVENTION

1. Field of the Invention

The present invention relates to the field of integrated circuit. More specifically, the present invention relates to inter-subsystem communication between subsystems on an integrated circuit device.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what's known as "system on a chip" or SOC. Typically, a SOC includes multiple "tightly coupled" subsystems performing very different functions. These subsystems often have a need to communicate and cooperate with each other on a regular basis.

U.S. Pat. No. 6,122,690 discloses an on-chip bus architecture that is both processor independent and scalable. The '690 patent discloses a bus that uses "standardized" bus interfaces to couple functional blocks to the on-chip bus. The "standardized" bus interfaces include embodiments for bus master functional blocks, slave functional blocks, or either. The '690 bus suffers from at least one disadvantage in that it does not offer rich functionalities for prioritizing interactions or transactions between the subsystems, which are needed for a SOC with subsystems performing a wide range of very different functions.

Accordingly, a more flexible approach to facilitate inter-subsystem communication between subsystems on a chip is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes interface units and operational methods for flexibly facilitating inter-subsystem communication between subsystems of a SOC. In the following description, various features and arrangements will be described, to provide a thorough understanding of the present invention. However, the present invention may be practiced without some of the specific details or with alternate features/arrangement. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Overview

Figure 1:
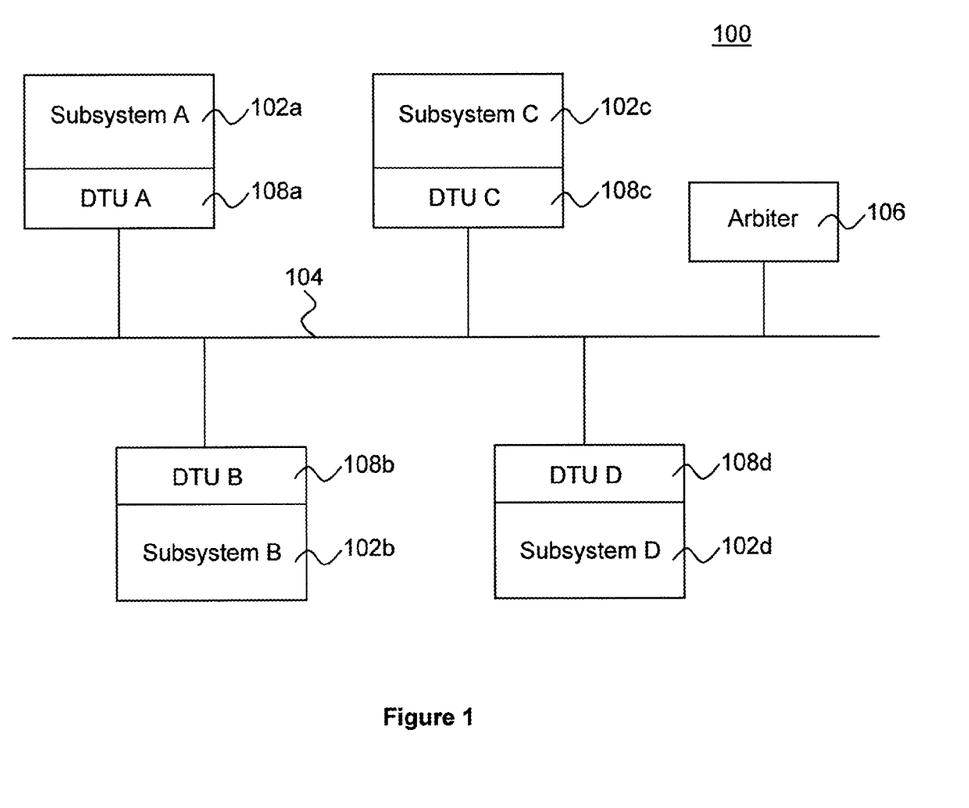
FIG. 1 illustrates an overview of a system on-chip including an on-chip bus and a number of subsystems coupled to the on-chip bus, in accordance with one embodiment.

Referring now to FIG. 1, wherein a block diagram illustrating an overview of a SOC 100 with subsystems 102a-102d incorporated with the teachings of the present invention for inter-subsystem communication, in accordance with one embodiment, is shown. As illustrated, for the embodiment, SOC 100 includes on-chip bus 104 and subsystems 102a-102d coupled to each other through bus 104. Moreover, each of subsystems 102a-102d includes data transfer unit or interface (DTU) 108a-108d incorporated with teachings of the present invention, correspondingly coupling the subsystems 102a-102d to bus 104. SOC 100 also includes arbiter 106, which is also coupled to bus 104.

In one embodiment, bus 104 includes a number of sets of request lines (one set per subsystem), a number of sets of grant lines (one set per subsystem), and a number of shared control and data/address lines. Included among the shared control lines is a first control line for a subsystem granted access to the bus (grantee subsystem, also referred to as the master subsystem) to assert a control signal to denote the beginning of a transaction cycle, and to de-assert the control signal to denote the end of the transaction cycle; and a second control line for a subsystem addressed by the grantee/master subsystem (also referred to as the slave subsystem) to assert a control signal to inform the grantee/master subsystem that the addressee/slave subsystem is busy (also referred to as "re-trying" the master system).

As a result of the facilities advantageously provided by DTU 108a-108d, and the teachings incorporated in subsystem 102a-102d, subsystems 102a-102d are able to flexibly communicate and cooperate with each other, allowing subsystems 102a-102d to handle a wide range of different functions having different needs. More specifically, as will be described in more detail below, in one embodiment, subsystems 102a-102d communicate with each other via transactions conducted across bus 104. Subsystems 102a-102d, by virtue of the facilities advantageously provided by DTU 108a-108d, are able to locally prioritize the order in which its transactions are to be serviced by the corresponding DTU 108a-108d to arbitrate for access to bus 104. Further, in one embodiment, by virtue of the architecture of the transactions, subsystems 102a-102d are also able to flexibly control the priorities on which the corresponding DTU 108a-108d are to use to arbitrate for bus 104 with other contending transactions of other subsystems 102a-102d.

Arbiter 106 is employed to arbitrate access to bus 104. That is, arbiter 106 is employed to determine which of the contending transactions on whose behalf the DTU 108a-108d are requesting for access (through e.g. the request lines of the earlier described embodiment), are to be granted access to bus 104 (through e.g. the grant lines of the earlier described embodiment).

SOC 100 is intended to represent a broad range of SOC, including multi-service ASIC. In particular, in various embodiments, subsystems 102a-102d may be one or more of a memory controller, a security engine, a voice processor, a collection of peripheral device controllers, a framer processor, and a network media access controller. Moreover, by virtue of the advantageous employment of DTU 108a-108d to interface subsystems 102a-102d to on-chip bus 104, with DTU 108a-108d and on-chip bus operating on the same clock speed, the core logic of subsystems 102a-102d may operate in different clock speeds, including clock speeds that are different from the clock speed of non-chip bus 104 and DTU 108a-108d. In one embodiment, one or more subsystems 102a-102d may be a multi-function subsystems, in particular, with the functions identified by identifiers. Except for the teachings of the present invention incorporated into subsystems 102a-102d, the exact constitution and the exact manner their core logic operate in providing the functions/services the subsystems are immaterial to the present invention. While for ease of understanding, SOC 100 is illustrated as having only four subsystems 102a-102d, in practice, SOC 100 may have more or less subsystems. In particular, by virtue of the advantageous employment of DTU 108a-108d to interface subsystems 102a-102d to on-chip bus 104, zero or more selected ones of subsystems 102a-102d may be removed, while other subsystems 102a-102d may be flexibly added to SOC 100.

Similarly, arbiter 106 may be any one of a number of bus arbiters known in the art. The facilities of DTU 108a-108d and the teachings incorporated into the core logic of subsystems 102a-102d to practice the present invention will be described in turn below.

Method

Figure 2:
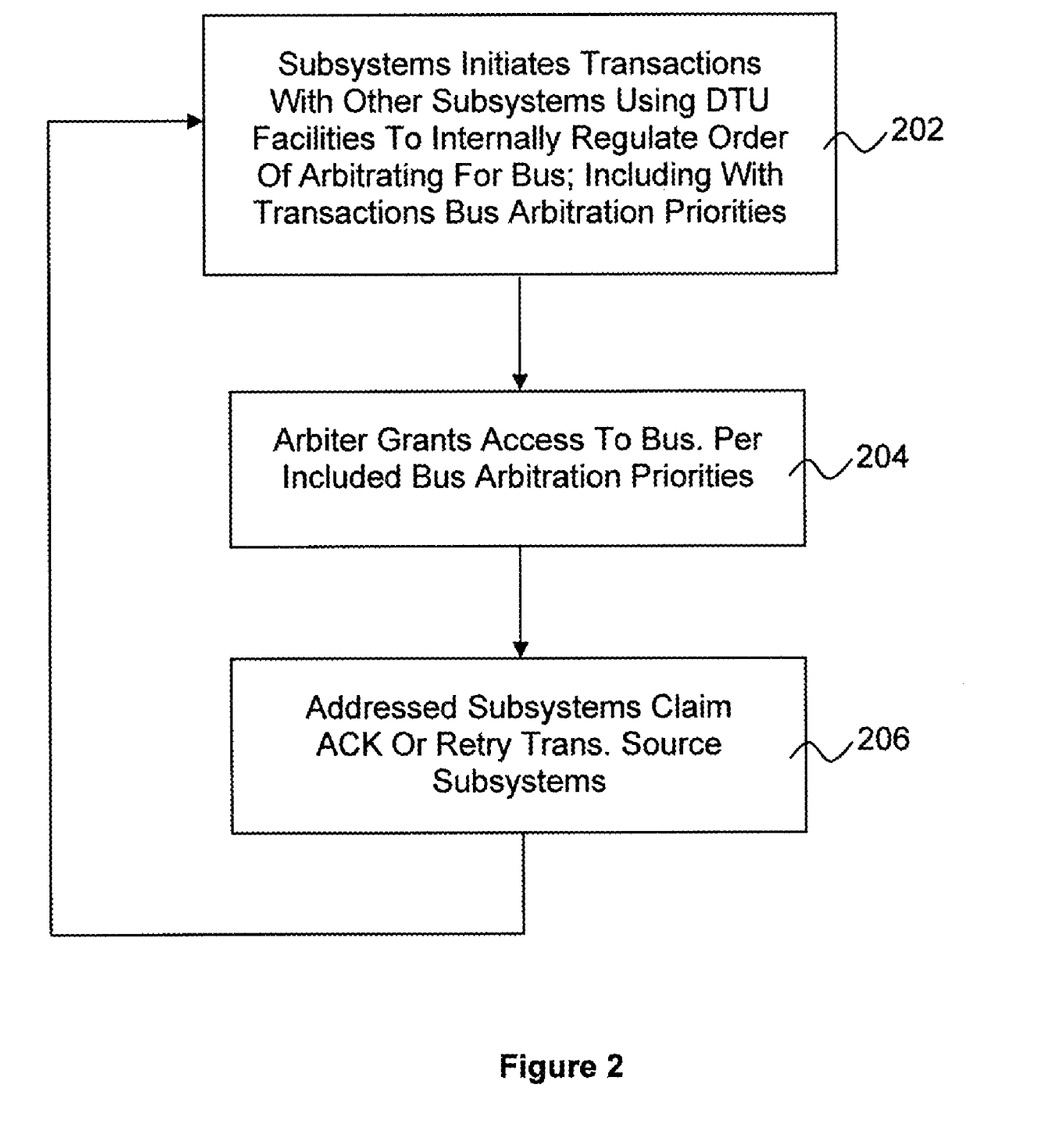
FIG. 2 illustrates the method of the present invention, in accordance with one embodiment.

Referring now to FIG. 2, wherein a flow chart illustrating a method of the present invention, in accordance with one embodiment, is shown. As illustrated, in accordance with the present invention, subsystems 102a-102d initiate transactions with one another, using the facilities of their corresponding DTU 108a-108d to locally prioritize the order the transactions of the corresponding subsystems are to be serviced, for arbitration for access to bus 104, block 202.

Further, for the embodiment, for each transaction, each subsystem 102a-102d also includes as part of the transaction the bus arbitration priority the corresponding DTU 108a-108d is to use to arbitrate for access to bus 104, when servicing the transaction in the prioritized manner.

In response, DTU 108a-108d service the transactions of the respective subsystems 102a-102d accordingly, and arbitrating for access to bus 104, using the bus arbitration priorities included among the transactions. Arbiter 106 in turn grants accesses to bus 104 based on the bus arbitration priorities of the contending transactions, block 204.

In one embodiment, arbiter 106 grants access strictly by the transaction priorities, e.g. in a three priority implementation, all high priority transactions will be granted access first, before the medium priority transactions are granted access, and finally the low priority transactions are granted access. In another embodiment, arbiter 106 further employs certain non-starvation techniques, to ensure the medium and/or low priority transactions will also be granted access to bus 104. The non-starvation techniques may be any one of a number of such techniques known in the art.

Still referring to FIG. 2, once granted access to bus 104, the grantee DTU 108* places the grantee transaction on bus 104 (through e.g. the shared data/address lines of the earlier described embodiment). In one embodiment, the transaction includes address of the targeted subsystem 102*. In response, once placed onto bus 104, the addressee subsystem 102* claims the transaction, and acknowledges the transaction, or if the subsystem 102* is busy, instructs the requesting subsystem 102* to retry later, block 206. If acknowledgement is given and a reply is due (as in the case of a read request), the reply is later initiated as a reply transaction. In other words, for the embodiment, "read" transactions are accomplished in a "split" manner.

In the present application, for ease of designation, the trailing "*" of a reference number denotes one of the instances of reference. For example, 108* means either 108a, 108b, 108c or 108d.

Exemplary Transaction Formats

Figure 3A:
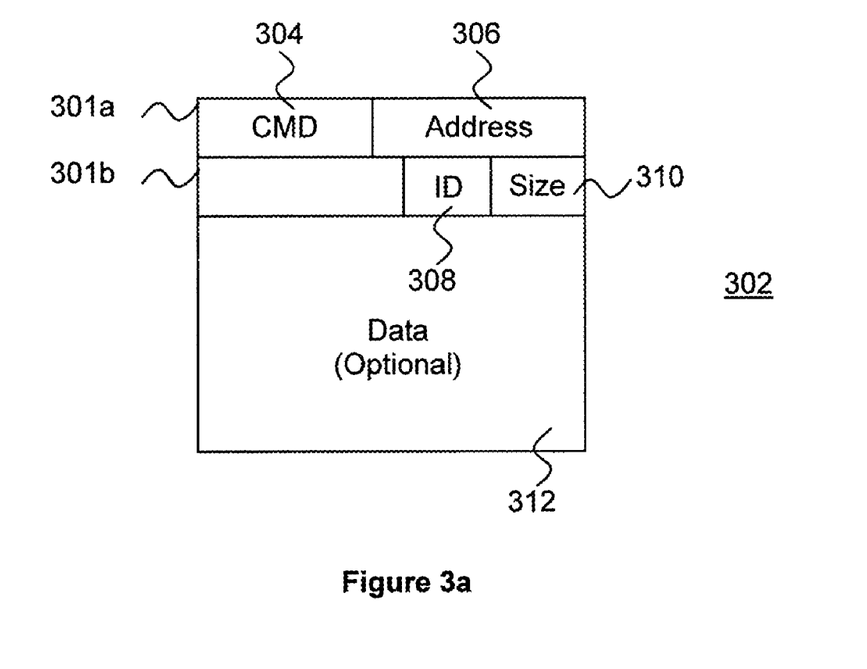
FIGS. 3a-3b illustrate a request and a reply transaction between two subsystems, in accordance with one embodiment.

FIGS. 3a-3b illustrate two exemplary transaction formats, a request format and a reply format, suitable for use to practice the present invention, in accordance with one embodiment. As illustrated in FIG. 3a, exemplary request transaction 302 includes three parts, first header 301a, second header 301b, and optional data portion 312. First header 301a includes in particular, a command or request code 304, which for the embodiment, includes the bus arbitration priority, and address 306 of the target subsystem 102*. The various subsystems 102a-102d of SOC 100 are assumed to be memory mapped. Arbitration is initiated by a DTU 108* requesting arbiter 106 for access (through e.g. the earlier described subsystem based request lines), including with the request the included bus arbitration priority in the command portion 304 of first header 301a. Second header 301b includes an identifier identifying a function of the originating subsystem 102*, allowing subsystem 102* to be a multi-function subsystem and be able to associate transactions with the various functions. Second header 301b also includes size 310. For write transactions, size 310 denotes the size of the write data to follow (the "optional" data portion), in number of bytes. For read transactions, size 310 denotes the size of the data being accessed (i.e. read), also in number of bytes.

Figure 3B:
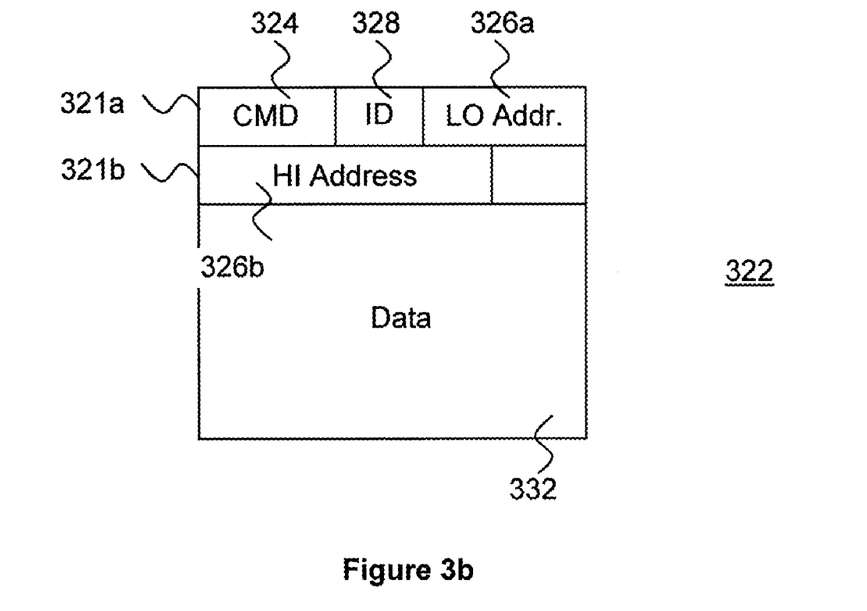

As illustrated in FIG. 3b, exemplary reply transaction 322 also includes three parts, first header 321a, second header 321b and data 332. First header 321a includes in particular, a command or request code 324, which includes the bus arbitration priority, identifier 328 which identifies the subsystem and its function, and low order byte of targeted address 326*a* of the replying subsystem 102\*. As alluded earlier, data 332 includes the data being accessed/read by the original read request. Again, arbitration is initiated by a DTU 108\* requesting arbiter 106 for access (through e.g. the earlier described subsystem based request lines), including with the request the included bus arbitration priority in the command portion 324 of first header 321*a*. Second header 321*b* includes the remaining high order bytes targeted address 326*a* of the replying subsystem 102\*. Accordingly, employment of these transaction formats enables a subsystem 102\* to communicate with another subsystem 102\* at any byte position, reducing the number of operations for unaligned data transfers.

In one embodiment, different commands are supported for "conventional" data versus control, and voice data. More specifically, for the embodiment, the commands supported are:

| Command Code | Command | Description |
| --- | --- | --- |
| 000 | Reserved | Reserved |
| 001 | DRead | Data Read Request |
| 010 | CRead | Control Read Request |
| 011 | VRead | Voice Read Request |
| 100 | DWrite | Data Write Request |
| 101 | CWrite | Control Write Request |
| 110 | VWrite | Voice Write Request |
| 111 | Reply | Read Reply |

Data Transfer Units

Figure 4:
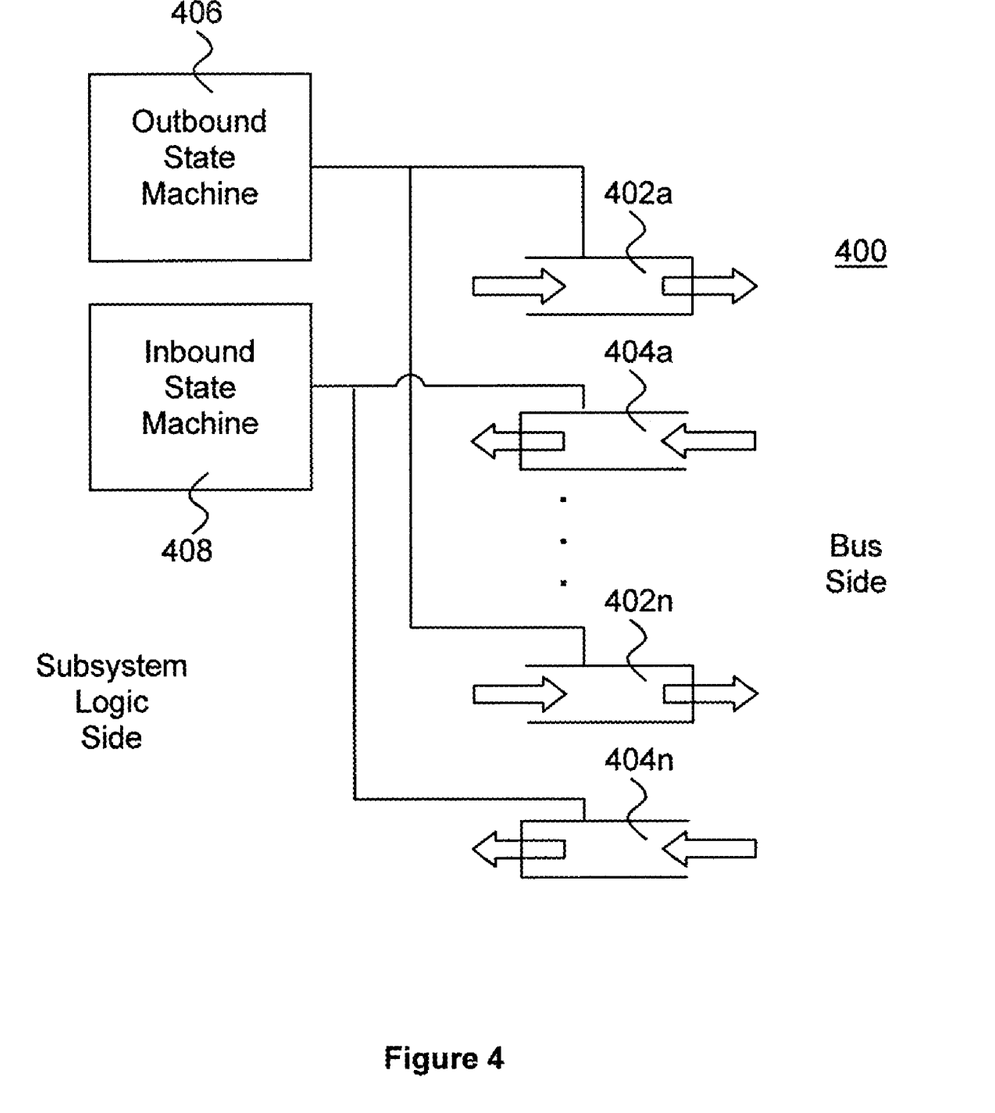
FIG. 4 illustrates data transfer unit of FIG. 1 in further detail, in accordance with one embodiment.

FIG. 4 illustrates DTU 108\* in further details, in accordance with one embodiment. As illustrated, DTU 108\* includes a number of pairs of outbound and inbound transaction queues 402\* and 404\*, one pair each for each priority level. For example, in one embodiment where DTU 108\* supports three levels of priority, high, medium and low, DTU 108\* includes three pairs of outbound and inbound transaction queues 402*a* and 404*a*, 402*b* and 404*b*, and 402*c* and 404*c*, one each for the high, medium and low priorities. In another embodiment, DTU 108\* supports two levels of priority, high and low, DTU 108\* includes two pairs of outbound and inbound transaction queues 402*a* and 404*a*, and 402*b* and 404*b*, one each for the high and low priorities. Of course, in other embodiments, DTU 108\* may support more than three levels of priority or less than two levels of priority, i.e. no prioritization.

Additionally, DTU 108\* includes outbound transaction queue service state machine 406 and inbound transaction queue service state machine 408, coupled to the transaction queues 402\* and 404\* as shown. Outbound transaction queue service state machine 406 services, i.e. processes, the transactions placed into the outbound queues 402\* in order of the assigned priorities of the queues 402\* and 404\*, i.e. with the transactions queued in the highest priority queue being serviced first, then the transaction queued in the next highest priority queue next, and so forth.

For each of the transactions being serviced, outbound transaction queue service state machine 406 provides the control signals to the corresponding outbound queue 402\* to output on the subsystem's request lines, the included bus arbitration priority of the first header of the "oldest" (in turns of time queued) transaction of the queue 402\*, to arbitrate and compete for access to bus 104 with other contending transactions of other subsystems 102\*. Upon being granted access to bus 104 (per the state of the subsystem's grant lines), for the embodiment, outbound transaction queue service state machine 406 provides the control signals to the queue 402\* to output the remainder of the transaction, e.g. for the earlier described transaction format, the first header, the second header and optionally, the trailing data.

Similarly, inbound transaction queue service state machine 408 provides the control signals to the corresponding inbound queue 402\* to claim a transaction on bus 104, if it is determined that the transaction is a new request transaction of the subsystem 102\* or a reply transaction to an earlier request transaction of the subsystem 102\*. Additionally, in one embodiment, if the claiming of a transaction changes the state of the queue 404\* from empty to non-empty, inbound transaction queue service state machine 408 also asserts a "non-empty" signal for the core logic (not shown) of the subsystem 102\*.

In due course, the core logic, in view of the "non-empty" signal, requests for the inbound transactions queued. In response, inbound transaction queue service state machine 408 provides the control signals to the highest priority non-empty inbound queue to cause the queue to output the "oldest" (in turns of time queued) transaction of the queue 404\*. If all inbound queues 404\* become empty after the output of the transaction, inbound transaction queue service state machine 408 de-asserts the "non-empty" signal for the core logic of the subsystem 102\*.

Thus, under the present invention, a core logic of a subsystem 102\* is not only able to influence the order its transactions are being granted access to bus 104, relatively to transactions of other subsystems 102\*, through specification of the bus arbitration priorities in the transactions' headers, a core logic of a subsystem 102\*, by selectively placing transactions into the various outbound queues 402\* of its DTU 108\*, may also utilize the facilities of DTU 108\* to locally prioritize the order in which its transactions are to be serviced to arbitrate for access for bus 104.

Queue pair 402\* and 404\* may be implemented via any one of a number of "queue" circuitry known in the art. Similarly, state machines 406-408, to be described more fully below, may be implemented using any one of a number programmable or combinatory circuitry known in the art. In one embodiment, assignment of priorities to the queues pairs 402\* and 404\* are made by programming a configuration register (not shown) of DTU 108\*. Likewise, such configuration register may be implemented in any one of a number of known techniques.

State Machines

Figure 5A:
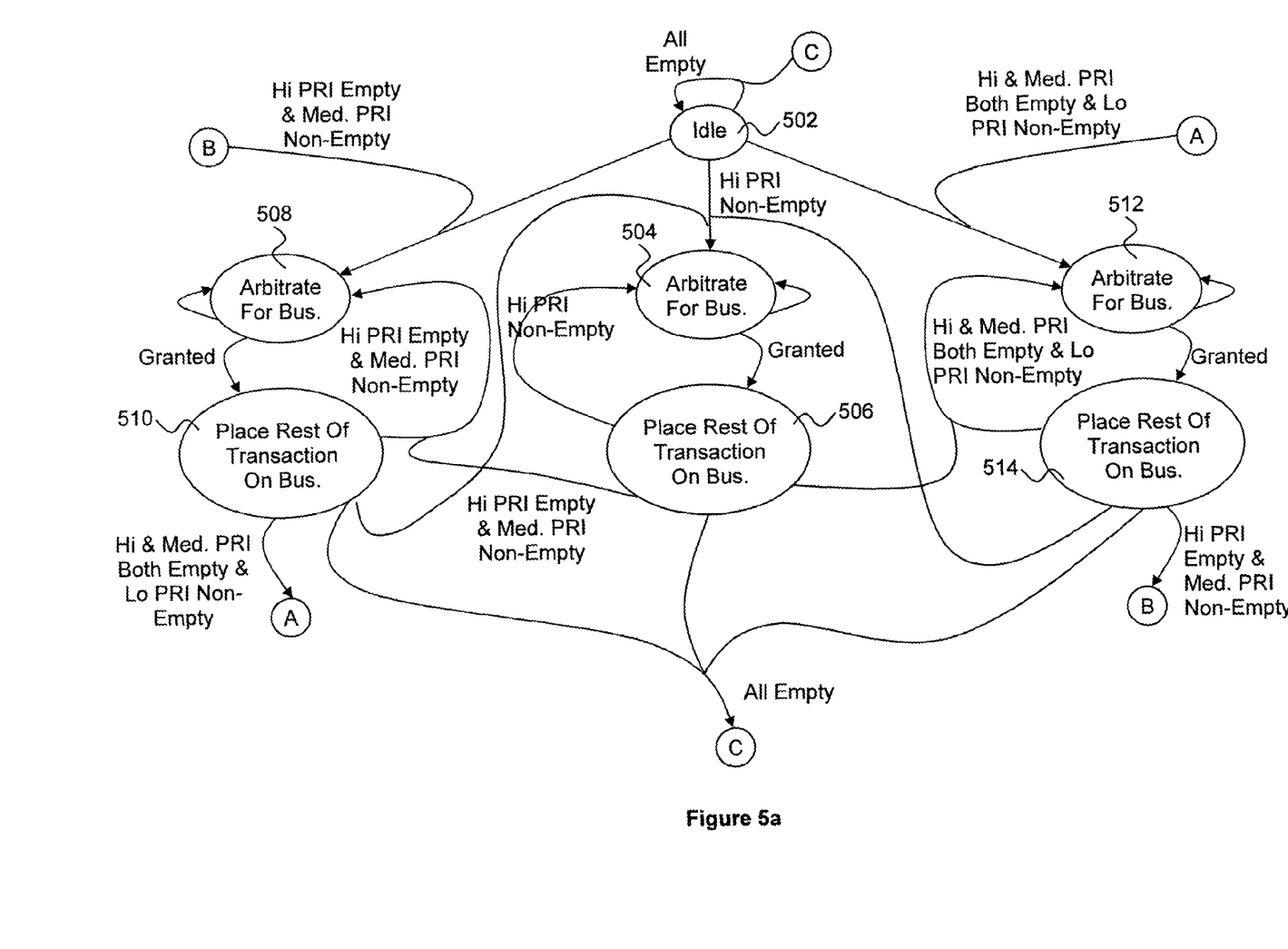
FIGS. 5a-5b illustrate the operational states and the transition rules for the state machines of FIG. 4, in accordance with one embodiment.
Figure 5B:
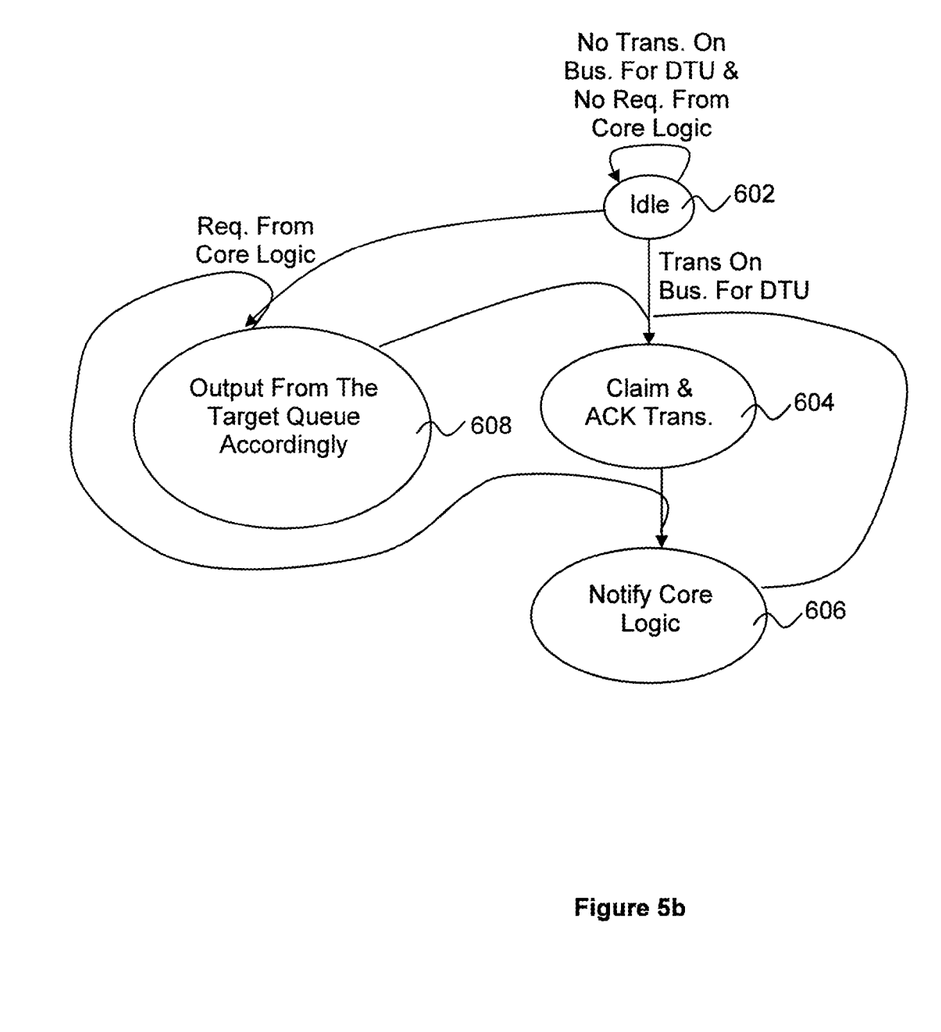

Referring now to FIGS. 5*a* and 5*b* wherein two state diagrams illustrating the operating states and transitional rules of state machines 406 and 408 respectively, in accordance with one embodiment, are shown. The embodiment assumes three pairs of queues 402*a* and 404*a*, 402*b* and 404*b*, and 402*c* and 404*c*, having three corresponding level of assign priorities, high, medium and low.

As illustrated in FIG. 5*a*, initially, for the embodiment, state machine 406 is in idle state 502. If state machine 406 detects that the high priority queue 402*a* is non-empty, it transitions to first arbitrate state 504, and arbitrate for access to bus 104 for the "oldest" (in terms of time queued) transaction queued in the high priority queue 402*a*. However, if while in idle state 502, state machine 406 detects that the high priority queue 420*a* is empty and the medium priority queue 402*b* is not empty, it transitions to second arbitrate state 508, and arbitrate for access to bus 104 for the "oldest" (in terms of time queued) transaction queued in the medium priority queue 402b. Similarly, if while in idle state 502, state machine 406 detects that both the high and medium priority queues 402a-402b are empty, and the low priority queue 402c is not empty, it transitions to third arbitrate state 512, and arbitrate for access to bus 104 for the "oldest" (in terms of time queued) transaction queued in the low priority queue 402c. If none of these transition conditions are detected, state machine 406 remains in idle state 502.

Upon arbitrating for access to bus 104 for the "oldest" (in terms of time queued) transaction queued in the highest priority queue 402a after entering first arbitrate state 504, state machine 406 remains in first arbitrate state 504 until the bus access request is granted. At such time, it transitions to first placement state 506, where it causes the granted transaction in the high priority queue 404a to be placed onto bus 104.

From first placement state 506, state machine 406 returns to one of the three arbitrate states 504, 508 and 512 or idle state 502, depending on whether the high priority queue 402a is empty, if yes, whether the medium priority queue 402b is empty, and if yes, whether the low priority queue 402c is also empty.

Similarly, upon arbitrating for access to bus 104 for the "oldest" (in terms of time queued) transaction queued in the medium priority queue 402b after entering second arbitrate state 508, state machine 406 remains in second arbitrate state 508 until the bus access request is granted. At such time, it transitions to second placement state 510, where it causes the granted transaction in medium priority queue 402b to be placed onto bus 104.

From second placement state 510, state machine 406 returns to one of the three arbitrate states 504, 508 and 512 or idle state 502, depending on whether the high priority queue 402a is empty, if yes, whether the medium priority queue 402b is empty, and if yes, whether the low priority queue 402c is also empty.

Likewise, upon arbitrating for access to bus 104 for the "oldest" (in terms of time queued) transaction queued in the low priority queue 402c, state machine 406 remains in third arbitrate state 512 until the bus access request is granted. At such time, it transitions to third placement state 514, where it causes the granted transaction in low priority queue 402b to be placed onto bus 104.

From third placement state 514, state machine 406 returns to one of the three arbitrate states 504, 508 and 512 or idle state 502, depending on whether the high priority queue 402a is empty, if yes, whether the medium priority queue 402b is empty, and if yes, whether the low priority queue 402c is also empty.

As illustrated in FIG. 5b, initially, for the embodiment, state machine 408 is also in idle state 602. While at idle state 602, if no transaction on bus 104 is addressed to the subsystem 102* (or one of the functions of the subsystem 102*, in the case of a reply transaction), nor are there any pending request for data from the core logic of the subsystem 102*, state machine 408 remains in idle state 602.

However, if the presence of a transaction on bus 104 addressed to the subsystem 102* (or one of the functions of the subsystem 102*, in the case of a reply transaction) is detected, state machine 408 transitions to claim state 604, where it provides control signals to the appropriate queue 404* to claim the transaction, and acknowledges the transaction.

If claiming of the transaction changes the state of the queues from all empty to at least one queue not empty, state machine 408 transitions to the notify state 606, in which it asserts the "non-empty" signal for the core logic of subsystem 102*, as earlier described.

From notify state 606, state machine 408 transitions to either claim state 604 if there is another transaction on bus 104 addressed to the subsystem 102* (or a function of the subsystem 102*, in case of a reply), or output state 608, if there is a pending request for data from the core logic of the subsystem 102*. From output state 608, state machine 408 either transitions to claim state 604 another transaction on bus 104 addressed to the subsystem 102* (or a function of the subsystem 102*, in case of a reply) is detected, remains in output state 608 if there is no applicable transaction on bus 104, but request for data from the core logic is outstanding, or returns to idle state 602, if neither of those two conditions are true.

Bus Signals, Timing and Rules
In one embodiment, the bus signals supported are as follows:

| Signal Name | Signal Width | Description |
| --- | --- | --- |
| MSCLK | 1 | Bus Clock (e.g. 25-100 MHz) |
| MSRST | 1 | System Bus Reset |
| MSAD[31:0] | 32 | Address/Data (tri-state, bi-directional) |
| MSCYC | 1 | Shared among subsystems to denote master bus cycles |
| MSREQ-1:0] | pair for each subsystem | Bus request, 2 per subsystem to gain ownership of bus |
| MSGNT | # of subsystems | Bus grant—signifies subsystem own the bus |
| MSSEL | 1 | Slave select—signifies subsystem has been selected (tri-state) |
| MSRDY | 1 | Master ready—signifies master data ready on the bus (tri-state) |
| MSBSY | 1 | Slave Busy—signifies selected device is busy (tri-state) |
| MSINT | # of subsystems | Interrupt request |

In one embodiment, the request codes supported are as follows:

| Req[1:0] | Request Type |
| --- | --- |
| 00 | Idle - no request |
| 01 | Low priority ("conventional" Data) |
| 10 | Medium priority (Control) |
| 11 | High priority (Voice and Replies) |

Figure 6A:
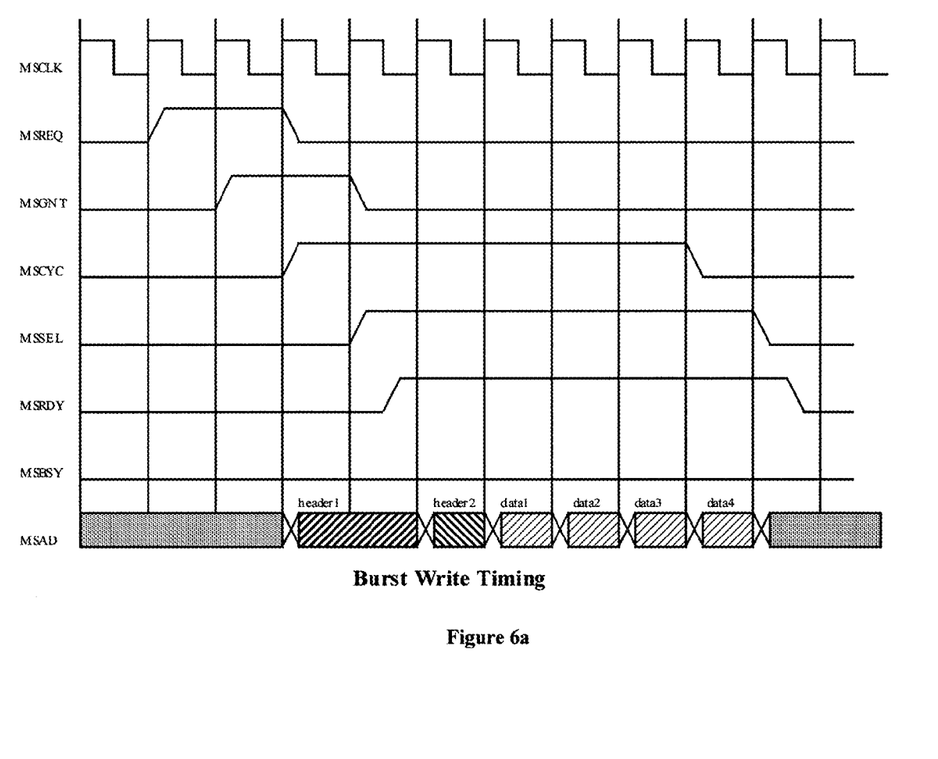
FIGS. 6a-6c are timing diagrams for practicing the present invention, in accordance with one implementation.
Figure 6B:
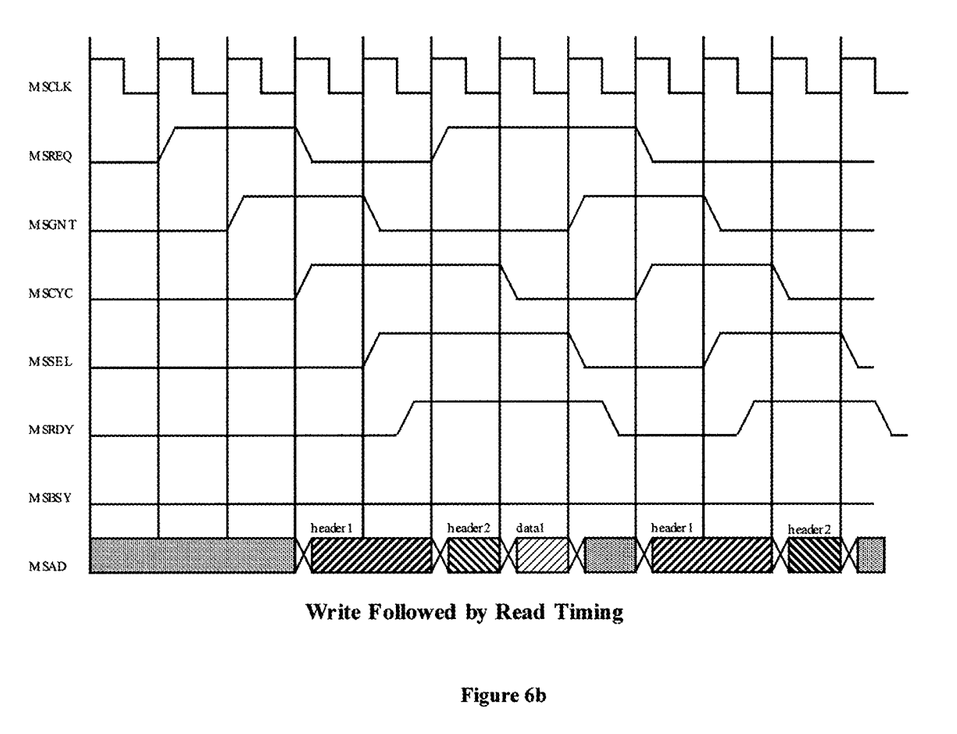
Figure 6C:
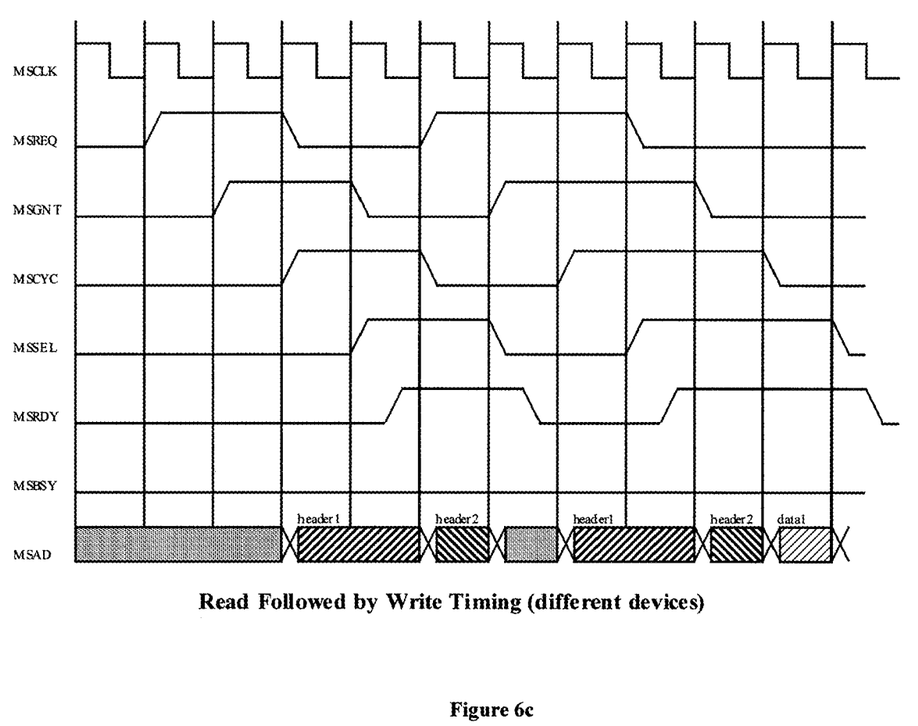

FIGS. 6a-6c are three timing diagrams illustrating the timings of the various signals of the above described embodiment, for burst write timing, write followed by read timing and read followed by write timing (different subsystems) respectively.

In one embodiment, the maximum burst transfer size is 64-bytes of data (+8 bytes for the transaction header). The subsystems guarantee the burst transfers to be within a page. The slave devices would accept the maximum sized transfer (64 bytes+header) before generating the above described MSSEL signal.

In one embodiment, each data transfer unit would permit only one Read request to be outstanding. If a Read request is pending, the subsystem would not accept requests from other masters until the reply to the outstanding Read request has been received. This advantageously prevents a deadlock condition. The subsystem may, however, continue to generate write requests.

In alternate embodiments, the present invention may be practiced with other approaches being employed to address these and other operational details.

Alternate Embodiment with Data Traffic Router

Figure 7:
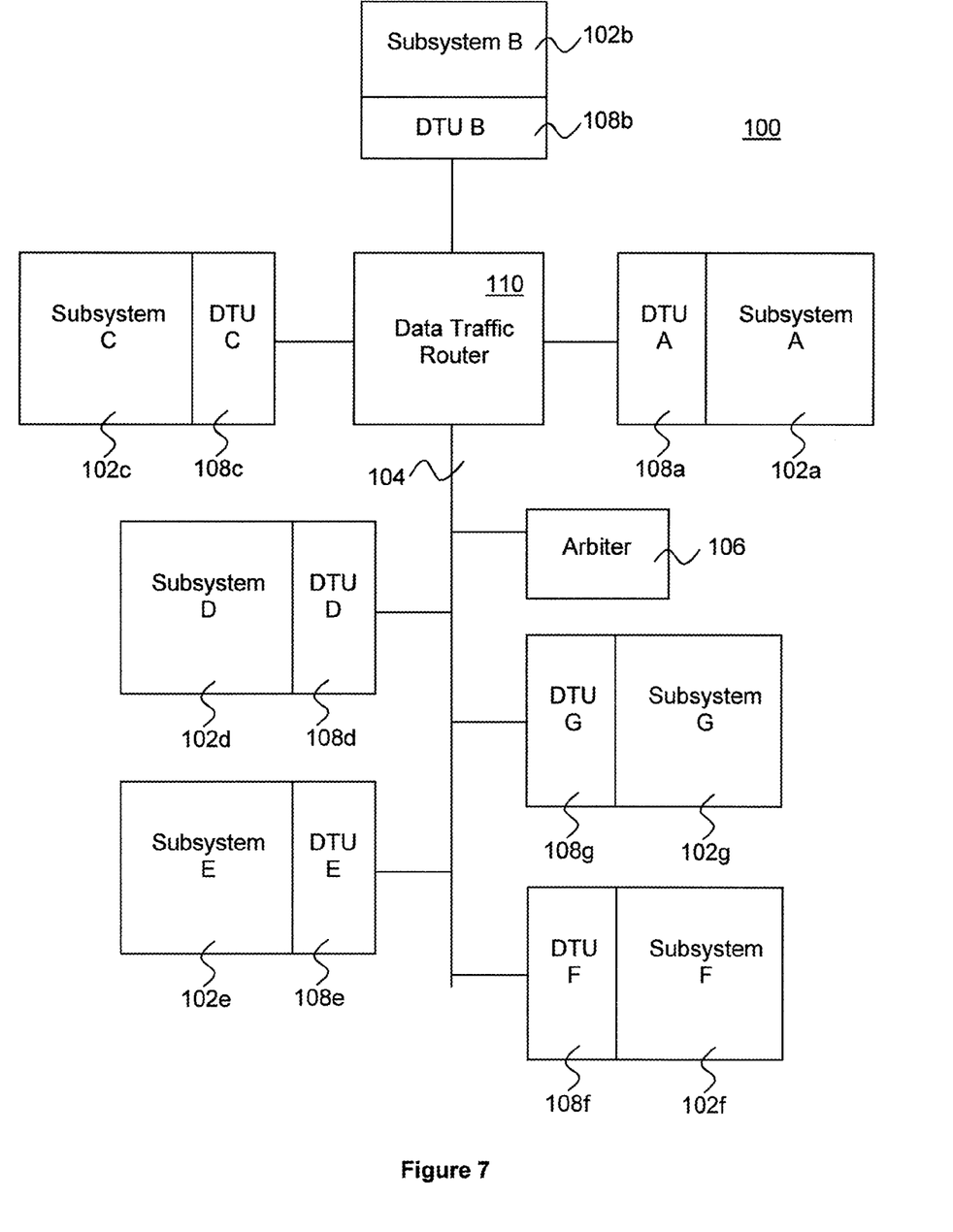
FIG. 7 illustrates another overview of a system on-chip further including a data traffic router, in accordance with an alternate embodiment.

Referring now to FIG. 7, wherein another overview of SOC 100, including the employment of data traffic router 110, in accordance with another embodiment is shown. As will be described in more detail below, data traffic router 110 advantageously enables selected combinations of the attached subsystems, such as subsystem A 102*a*, subsystem B 102*b*, subsystem C 102*c*, and the subsystem among subsystems D-G 102*d*-102*g* granted access to on-chip bus 104 to concurrently communicate with one another. For example, subsystem A 102*a* may be communicating with subsystem B 102*b*, while at the same time subsystem B 102*b* may be communicating with subsystem C 102*c*, subsystem C communicating with one of subsystem D-G 102*d*-102*g* having been granted access to on-chip bus 104, and so forth. Thus, data traffic router 110 is particularly useful for embodiments of SOC 100 where a subset of the subsystems 102*a*-102*g* has a relatively higher volume of communications with other subsystems. For example, in one embodiment of SOC 100 comprising a processor controlling the overall operation of SOC 100, an on-chip memory, and an external device controller having multiple external devices attached to them, these subsystems, i.e. the processor, the on-chip memory, and the external device controller all have relatively more communication needs than other subsystems 102* of SOC 100.

Data Traffic Router

Figure 8:
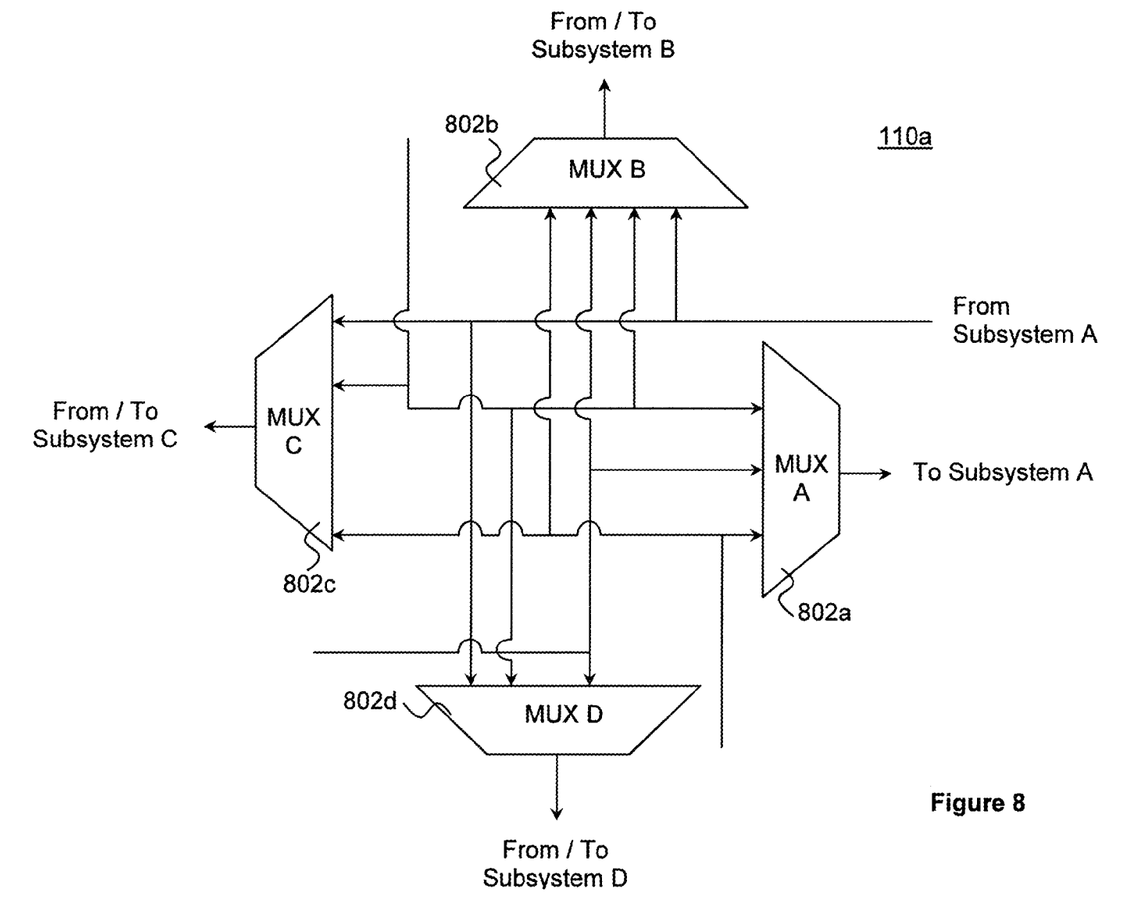
FIG. 8 illustrates the data aspect of the data traffic router of FIG. 7 in further details, in accordance with one embodiment.

FIG. 8 illustrates the data paths 110*a* of data traffic router 110 in accordance with one embodiment. As illustrated, for the embodiment, multiplexor 802*a* is coupled to subsystem B 102*b*, subsystem C 102*c* and at any instance in time, one of subsystems D-G 102*d*-102*g*, the current grantee subsystem of on-chip bus 104, to select and output one of the outputs of these subsystems for subsystem A 102*a*. Similarly, multiplexor 802*b* is coupled to subsystem A 102*a*, subsystem C 102*c* and at any instance in time, one of subsystems D-G 102*d*-102*g*, the current grantee subsystem of on-chip bus 104, to select and output one of the outputs of these subsystems for subsystem B 102*b*. For the embodiment, multiplexor 802*b* may also select the output of subsystem B 102*b* and output it back for subsystem B 102*b*, thereby enabling two external devices attached to subsystem B 102*b* to communicate with one another.

In like manner, multiplexor 802*c* is coupled to subsystem A 102*a*, subsystem B 102*b*, and at any instance in time, one of subsystems D-G 102*d*-102*g*, grantee subsystem of on-chip bus 104, to select and output one of the outputs of these subsystems for subsystem C 102*b*, and multiplexor 802*d* is coupled to subsystem A 102*a*, subsystem B 102*b*, and subsystem C 802c to select and output one of the outputs of these subsystems for one of subsystem D-G 102*d*-102*g*, the current grantee subsystem of on-chip bus 104.

Thus, it can be seen by selectively configuring multiplexors 802*a*-802*d*, communications between a subset of selected combinations of subsystem A-G 102*a*-102*g* may be facilitated concurrently.

Figure 9:
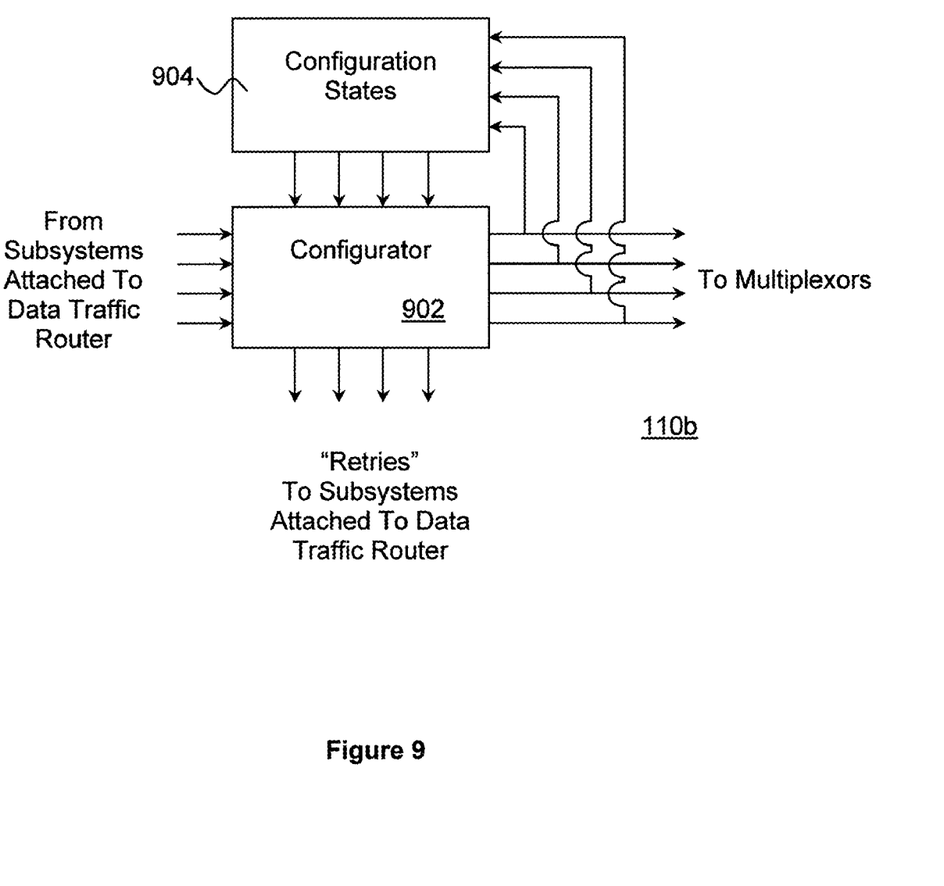
FIG. 9 illustrates the control aspect of the data traffic router of FIG. 7 in further details, in accordance with one embodiment.

FIG. 9 illustrates the control aspect 110*b* of data traffic router 110, in accordance with one embodiment. As illustrated, for the embodiment, the control aspect 110*b* of data traffic router 110 includes configurator 902 and configuration states storage unit 904 coupled to one another. Further, configurator 902 is coupled to the various subsystems, i.e. subsystem A 102*a*, subsystem B 102*b*, subsystem C 102*c*, and in any instance in time, one of subsystems D-G 102*d*-102*g*, the grantee subsystem of on-chip bus 104, and receiving the outputs of these subsystems. More specifically, for the embodiment, recall, upon granted access to on-chip bus 104, each of these subsystems outputs the header of a transaction, which includes an address of the addressee subsystem, denoting the destination of the output.

Thus, based at least on the headers of the transactions, configurator 902 is able to discern the desired destinations of the outputs of the various subsystems. In response, configurator 902 generates and provides control signals to multiplexors 802*a*-802*d* to configure multiplexors 802*a*-802*d* to correspondingly select the appropriate inputs of the multiplexors 802*a*-802*d* to provide the appropriate data paths for the data to reach the desired destinations, if configurator 902 is able to do so. That is, if the required multiplexors 802*a*-802*d* have not already been configured to provide data paths for other communications first.

Thus, configurator 902 generates and provides control signals to multiplexors 802*a*-802*d* to configure multiplexors 802*a*-802*d* based at least in part on the current configuration states of multiplexors 802*a*-802*d*. If a needed multiplexor is idle, and may be configured to provide the desired path. Configurator 902 generates and outputs the appropriate control signal for the multipelxor to configure the multiplexor to provide the appropriate path. Moreover, the new configuration state of the multiplexor is tracked and stored in configuration state storage unit 904 for use in subsequent configuration decisions. On the other hand, if the multiplexor is busy, that is it has already been configured to facilitate another communication, for the embodiment, configurator 902 notifies the subsystem accordingly. More specifically, for the embodiment, configurator 902 "retries" the subsystem, notifying the source subsystem that the destination subsystem is busy.

For the embodiment, as described earlier, upon granted access to on-chip bus 104, each subsystem drives a control signal denoting the beginning of a transaction, and at the end of the transaction, deasserts the control signal, denoting the end of the transaction. Thus, responsive to the deassertion of the control signal denoting the end of the transaction, configurator 902 returns the corresponding multiplexor to the idle state, making the multiplexor available to be configured in a next cycle to facilitate another communication.

CONCLUSION AND EPILOGUE

Thus, it can be seen from the above descriptions, an improved method and apparatus for inter-subsystem communication between subsystems of a SOC has been described. The novel scheme includes a data traffic router that is particularly instrumental in facilitating concurrent communications between subsystems with high communication needs. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. A data traffic router for use in an integrated circuit (IC) to interface a plurality of subsystems of said IC, the data traffic router comprising:
   a first multiplexor coupled to a first, a second and a third subsystem of said IC to select and output for said third subsystem one of a first output of said first subsystem and a second output of said second subsystem;
   a second multiplexor coupled to said first, second and third subsystems of said IC to select and output for said second subsystem one of said first output of said first subsystem and a third output of said third subsystem; and
   a third multiplexor coupled to said first second and third subsystems to select and output for said first subsystem one of said second output of said second subsystem and said third output of said third subsystem.

2. The data traffic router of claim 1, further comprising a controller coupled to said first, second, and third subsystems and said first, second and third multiplexors to control operation of said first, second and third multiplexors.

3. The data traffic router of claim 1, further comprising a fourth multiplexor coupled to a fourth subsystem, and said first, second and third subsystems to select for said fourth subsystem one of said first output of said first subsystem, said second output of said second subsystem, or said third output of said third subsystem.

4. The data traffic router of claim 3, wherein said first multiplexor is further coupled to said fourth subsystem and equipped to select for said third subsystem, a fourth output of said fourth subsystem in lieu of selecting one of said first and second outputs.

5. The data traffic router of claim 3, wherein said second mulitiplexor is further coupled to said fourth subsystem and equipped to select for said second subsystem, a fourth output of said fourth subsystem in lieu of selecting one of said first and third outputs.

6. The data traffic router of claim 3, wherein said third multiplexor is further coupled to said fourth subsystem and equipped to select for said first subsystem, a fourth output of said fourth subsystem in lieu of selecting one of said second and third outputs.

7. The data traffic router of claim 1, wherein said third multiplexor is coupled to said first subsystem via an on-chip bus, and said first subsystem is a grantee subsystem of a fourth plurality of subsystems attached to said on-chip bus.

8. The data traffic router of claim 1, wherein said first multiplexor is also coupled to receive the third output of said third subsystem to potentially select for itself said third output of said third subsystem in lieu of selecting one of said first and second outputs of said first and second subsystems, to facilitate a first and a second device attached to said third subsystem in communicating with one another.

9. An integrated circuit comprising
   a first subsystem;
   a second subsystem;
   a third subsystem; and
   a data traffic router coupled to the first, second and third subsystems to facilitate concurrent communications between at least two selected combinations of said first, second and third subsystems;
   wherein said data traffic router comprises a plurality of multiplexors coupled to said first, second and third subsystems to select for said subsystems respectively, outputs of the other subsystems.

10. The integrated circuit of claim 9, wherein said multiplexors of said data traffic router comprise
    a first multiplexor coupled to said subsystems to select and output for said third subsystem one of a first output of said first subsystem and a second output of said second subsystem;
    a second multiplexor coupled to said subsystems to select and output for said second subsystem one of said first output of said first subsystem and a third output of said third subsystem; and
    a third multiplexor coupled to said subsystems to select and output for said first subsystem one of said second output of said second subsystem and said third output of said third subsystem.

11. The integrated circuit of claim 10, wherein said first multiplexor is also coupled to receive the third output of said third subsystem to potentially select for itself said third output of said third subsystem in lieu of selecting one of said first and second outputs of said first and second subsystems, to facilitate a first and a second device attached to said third subsystem in communicating with one another.

12. The integrated circuit of claim 11, wherein said third subsystem is an external device controller.

13. The integrated circuit of claim 10, wherein the integrated circuit further comprises a fourth subsystem;
    said multiplexors of said data traffic router further comprises a fourth multiplexor coupled to a fourth subsystem, and said first, second and third subsystems to select for said fourth subsystem one of said first output of said first subsystem, said second output of said second subsystem, and said third output of said third subsystem.

14. The integrated circuit of claim 9, wherein said integrated circuit further comprises a fourth plurality of subsystems, including said first subsystem, and an on-chip bus coupling said fourth plurality of subsystems, including first subsystem, to one of said multiplexors.

15. The integrated circuit of claim 14, wherein each of said fourth plurality of subsystems is a selected one of a security engine, a voice processor, a collection of peripheral device controllers, a framer processor, or a network media access controller.

16. The integrated circuit of claim 9, wherein said second subsystem is a selected one of a processor and a memory controller.

* * * * *